3,316,274
PROCESS FOR PREPARATION OF 2-ACETONYL-BENZOXAZOLES AND NAPHTHOXAZOLES
Emil B. Rauch, Port Dickinson, and John A. Welsh, Binghamton, N.Y., assignors to General Aniline & Film Corporation, New York, N.Y., a corporation of Delaware
No Drawing. Filed Jan. 18, 1965, Ser. No. 426,425
9 Claims. (Cl. 260—307)

This invention relates to a process of preparing 2-acetonyloxazoles which comprises reacting a 2-methyloxazole with an alkyl ester of an aliphatic carboxylic acid in an amide diluent using an alkali metal hydride catalyst.

In our copending application, Ser. No. 426,387, filed on even date of this application, we have disclosed a new method of preparing 2-phenacyloxazoles. The process comprises reacting a suitable 2-methyloxazole, such as 2-methylbenzoxazole, with an alkyl ester of an aromatic carboxylic acid, such as ethyl benzoate, in an inert diluent, such as an aromatic hydrocarbon, using an alkali metal hydride catalyst. Generally speaking the process disclosed in said copending application is not utilizable in the preparation of the compounds of this invention since the corresponding alkyl esters of aliphatic monocarboxylic acids have a tendency to condense with themselves rather than with the 2-methyl group of the 2-methyloxazole compounds. This propensity towards auto-condensation is particularly marked in the condensation of esters of acetic and propionic acids. This self-condensation is so prevalent when using an aromatic hydrocarbon diluent that essentially all of an alkyl ester of acetic acid will condense with itself to form acetoacetic acid ester without any reaction of the 2-methyl group of the 2-methyloxazole compound.

The object of this invention is to provide a new method of preparing 2-acetonyloxazoles. A further object of this invention is to provide a method of preparing 2-acetonylbenzoxazoles.

We have now found that it is possible to condense alkyl esters of acids such as acetic acid, propionic acid, etc. with 2-methyloxazoles using a suitable alkali metal catalyst hydride by carrying out said reaction in an amide diluent such as dimethyl formamide. This is highly surprising since attempts to carry out the condensation of alkyl esters of aromatic monocarboxylic acids under the same conditions in a diluent of this type (dimethyl formamide) has resulted in lower yields of 2-phenacyloxazoles than when an aromatic hydrocarbon diluent was employed. Whereas the condensation of an alkyl ester of a lower aliphatic monocarboxylic acid in an aromatic hydrocarbon diluent results in essentially complete autocondensation, yields as high as 30% of the desired 2-acetonyloxazoles have been obtained by carrying out the reaction in dimethyl formamide.

The 2- acetonyloxazoles of this invention can be represented by the formula

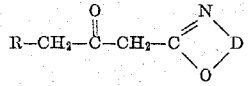

wherein D is an ortho divalent arylene group, R is a group selected from the class consisting of hydrogen, halogen, alkyl of 1 to 16 carbon atoms and haloalkyl of 1 to 16 carbon atoms.

Briefly, the compounds of our invention can be prepared by reacting a suitable 2-methyloxazole with an alkyl ester of an aliphatic carboxylic acid having 2 to 18 carbon atoms in the acid moiety in an amide diluent, such as dimethyl formamide and dimethyl acetamide, using a catalytic amount of alkali metal hydride catalyst. The reaction is carried out at a temperature of about 20 to 120° C. until the evolution of hydrogen from the decomposition of the alkali metal hydride has ceased.

Suitable 2-methyloxazoles of the benzene and naphthalene series utilizable in our invention include 2-methylbenzoxazole, 2,5,6-trimethylbenzoxazole, 2-methyl-5-ethylbenzoxazole, 2-methyl-4-bromobenzoxazole, 2-methyl-5-octylbenzoxazole, 2-methyl-naphth(2.3) oxazole, 2-methyl-naphth(2.1) oxazole, 2-methyl-naphth(1.2) oxazole, etc. Of these the commercially available 2-methylbenzoxazole, 2,5,6-trimethylbenzoxazole and 5-phenyl-2-methylbenzoxazole are preferred since these compounds are commercially available and are desirable starting materials for the preparation of dyes useful in photographic emulsions. As used herein the terms "a 2-methylbenzoxazole," and "a 2-methylnaphthoxazole" include the corresponding substituted and unsubstituted oxazoles containing innocuous, non-reactive substituents on the arylene ring, such as alkyl, halo (e.g. chloro or bromo), hydroxy, alkoxy (e.g. methoxy or ethoxy) which do not interfere with the claimed reaction. Accordingly compounds bearing these groups are deemed to be equivalents of the unsubstituted 2-methyloxazoles of the benzene and naphthalene series.

Suitable alkyl esters of aliphatic monocarboxylic acids useful in our invention include methyl acetate, ethyl acetate, ethyl propionate, chloroethyl acetate, ethyl β-chloropropionate, octyl butyrate, ethyl stearate, etc. In general, the lower alkyl (methyl and ethyl) esters of acetic acid and propionic acid are preferred. The alcohol moiety of the ester is relatively unimportant since the alcohol portion does not end up in the final 2-acetonyloxazole compound. The esters of acetic and propionic acids are preferred since these groupings result in 2-acetonyloxazole compounds which have the greatest utility in subsequent formation of dye intermediates. Esters of the higher carboxylic acids, such as the butyrate through stearate, are less preferred because of the bulky nature imparted to the ketonic chain of the 2-oxazole compounds.

Unfortunately the preferred aliphatic monocarboxylic acid esters have the greatest tendency towards autocondensation. This tendency towards autocondensation decreases as the chain length of the carboxylic acid moiety increases. Accordingly, the yield of 2-acetonyloxazole compound increases as the chain length of aliphatic acid moiety increases. This is counterbalanced by the greater utility of the 2-acetonyloxazole based on esters of acetic acid and propionic acid. In view of this tendency of the lower aliphatic acids to react with each other, it is desirable in order to maximize yields of the desired product to employ at least one mole of the lower aliphatic monocarboxylic acids per mole of 2-methyloxazole.

The catalysts utilizable in our invention comprise the alkali metal hydrides such as sodium hydride, potassium hydride, lithium hydride, rubidium hydride and cesium hydride. These catalysts can be used in a concentration of about 0.5 to 5 moles per mole of 2-methyloxazole. Unlike our copending application where the yield of 2-phenacyloxazoles increases as the concentration of the alkali metal hydride increases from about 1 to 2 moles per mole of 2-methyloxazole, the yield of 2-acetonyloxazoles does not appear to increase as the concentration of catalyst increases from 1 to 2 moles per mole of 2-methyloxazole. Accordingly, it is preferred from an economic point of view to use about one mole of alkali metal hydride catalyst per each mole of 2-methyloxazole.

Diluents utilizable in our invention include the N,N-disubstituted amides of lower fatty acids, such as N,N-dimethyl formamide and N,N-dimethyl acetamide.

The exothermic condensation can be carried out coneniently at temperatures of about 20 to 120° C. or higher. The maximum tempearture utilizable is generally dependent upon the boiling point of the diluent in which the reaction is carried out. If desired, pressure apparatus and higher temperatures can be utilized. However no advantages have been found in such techniques.

As indicated above, the 2-acetonyloxazoles of this invention are valuable dye intermediates. These compounds have an active methylene group which makes it possible to condense them with β-anilino-vinylazolium salts to form merocyanine dyes.

The examples following are merely illustrative and should not be construed as limiting the scope of this invention.

Example I

This example illustrates the preparation of 2-acetonylbenzoxazole. One hundred and fifty ml. dry dimethyl formamide and 24 g. (0.5 M) of sodium hydride (50% oil dispersion) were placed in a clean dry 1-liter flask equipped with stirrer, reflux condenser, nitrogen inlet and outlet tubes. There was added under nitrogen a solution of 66 g. 2-methylbenzoxazole (0.5 M) in 100 ml. dry dimethyl formamide. A solution of 44 g. ethyl acetate (0.5 M) in 150 ml. dry dimethyl formamide was added dropwise over a thirty mintue period. The evolution of hydrogen was vigorous and the reaction rapidly reached a temperature of 58° C. where it was maintained by a cold water bath. After the evolution of hydrogen ceased, the clear red solution was cooled to 50° C. and added to 1500 ml. water. The aqueous composition was adjusted to pH 5 with glacial acetic acid. The brown oil layer was separated and the aqueous layer was extracted with ether. The oil layer and ether extract were combined, dried with sodium sulfate, the ether evaporated and the 2-acetonylbenzoxazole distilled at 124–134° C./2 mm. Twenty-one and two-tenths grams of a yellow oily 2-acetonylbenzoxazole composition was stirred in pet ether to give 15.5 g. (20% of theoretical yield) of a white crystalline solid melting at 75–76° C.

Analysis for $C_{10}H_9NO_2$: Calc.: C, 68.55%; H, 5.18%; N, 7.99%. Found: C, 68.68%, 68.63%; H, 5.17%, 5.09%; N, 7.73%, 7.94%.

Essentially the same results are obtained by replacing the ethyl acetate with equivalent molar concentration of methyl acetate or propyl acetate or by replacing sodium hydride with an equivalent molar concentration of potassium hydride.

The corresponding 2-(ω-chloroacetonyl)-benzoxazole is obtained by using 0.5 mole ethyl chloroacetate in place of ethyl acetate.

Example II

This example illustrates the preparation of 2-(ω-methylacetonyl)-5,6 - dimethylbenzoxazole. Fifty ml. dry dimethyl formamide and 64 g. (0.133 M) sodium hydride (50% oil dispersion) were placed in a clean dry 500 ml. flask equipped with stirrer, reflux condenser, nitrogen inlet and outlet tubes. There was added under nitrogen a solution of 21.4 g. 2,5,6-trimethylbenzoxazole (0.133 M) in 50 ml. dry dimethyl formamide. A solution of 13.6 g. ethyl propionate (0.133 M) in 35 ml. dry dimethyl formamide was added dropwise over a thirty minute period. The evolution of hydrogen was vigorous and reaction rapidly reached a temperature of 60–65° C., where it was maintained with alternate heating and cooling. After the evolution of hydrogen ceased, the clear red solution was cooled to 50° C. and added to 300 ml. water. The aqueous composition was adjusted to pH 5 with glacial acetic acid, cooled and stirred until the gummy solid 2-(ω-methylacetonyl)-5,6-dimethylbenzoxazole became filterable. The product was filtered, washed with water and dried over calcium chloride. After one recrystallization from pet ether there was obtained 10 g. of light yellow crystalline 2-(ω-methylacetonyl)-5,6 - dimethylbenzoxazole (35% of the theoretical yield) which melted at 81–83° C. After a second recrystallization the product melted at 84–84.5° C.

Analysis for $C_{13}H_{15}NO_2$: Calc.: C, 71.86%; H, 6.96%. Found: C, 71.85%, 71.96%; H, 6.90%, 7.05%.

The corresponding 2-(ω-heptadecylacetonyl)-5,6 - dimethylbenzoxazole is obtained by using 0.133 mole ethyl stearate in place of ethyl propionate. The corresponding 2-(ω-methylacetonyl)-naphth (1.2)oxazole is obtained by using 0.133 mole 2-methylnaphth(1.2) oxazole in place of 2,5,6-trimethylbenzoxazole.

Example III

This example illustrates the preparation of 2-acetonyl-5,6-dimethylbenzoxazole. The process described in Example II was employed using a reaction temperature of 38–50° C. and the following reactant compositions:

A. 4.8 g. (0.1 M) sodium hydride (50% oil dispersion) in 50 ml. dimethyl formamide.
B. 16.1 g. 2,5,6-trimethylbenzoxazole (0.1 M) in 50 ml. dimethyl formamide.
C. 8.8 g. ethyl acetate (0.1 M) in 40 ml. dimethyl formamide.

Fifteen and seven-tenths grams of dry product was recovered by filtration from the acidulated aqueous reaction mixture. The material was purified by taking the fraction distilling at between 120–150° C. at 0.1 mm. and recrystallizing twice from pet ether. The 2-acetonyl-5,6-dimethylbenzoxazole melted at 100–102° C.

Analysis for $C_{12}H_{13}NO_2$: Calc.: C, 70.91%; H, 6.45%. Found: C, 71.42%, 71.08%; H, 6.39%, 6.42%.

The corresponding 2-acetonyl-5-chlorobenzoxazole is obtained by using 0.1 mole of 2-methyl-5-chlorobenzoxazole in place of 2,5,6-trimethylbenzoxazole. The corresponding 2-acetonyl-5-phenylbenzoxazole is obtained by using 0.1 mole of 2-methyl-5-phenylbenzoxazole in place of 2,5,6-trimethylbenzoxazole.

Example IV

This example illustrates the preparation of 2-(ω-methylacetonyl)-benzoxazole. The process described in Example I was employed using the following reactant compositions:

A. 24 g. (0.5 M) sodium hydride (50% oil dispersion) in 120 ml. dimethyl formamide.
B. 66.5 g. 2-methylbenzoxazole (0.5 M) in 120 ml. dimethyl formamide.
C. 51 g. ethyl propionate (0.5 M) in 150 ml. dimethyl formamide.

A brown oil was separated from the acidulated aqueous reaction mixture. The aqueous portion was extracted three times with 100 ml. portions of chloroform. The chloroform extracts and brown oil were combined, dried with sodium sulfate, the chloroform distilled off and the product distilling at 138–142° C./2 mm. was collected. The light yellow oil distillate which crystallized on cooling to 15° C., was dissolved in pet ether. On cooling to 5° C., 17 g. (20% of theoretical yield) of white crystalline 2-(ω-methylacetonyl)-benzoxazole having a melting point of 30–32° C. was obtained.

Analysis for $C_{11}H_{11}O_2N$: Calc.: C, 69.82%; H, 5.64%; N, 7.40%. Found: C, 69.60%, 69.69%; H, 5.88%, 5.76%; N, 7.47%, 7.75%.

Essentially the same results are obtained using dimethyl acetamide as the diluent.

Variations and modifications can be made in the procedures, compositions and materials herein described without departing from the scope or spirit of this invention. In the claims that follow the term "arylene" is used in a generic sense to include substituted and unsubstituted divalent aromatic groups and the terms "phenylene" and "naphthalene" are used to include unsubstituted and hydrocarbon substituted groups unless other substituents are specifically recited.

We claim:

1. The process of preparing a 2-acetonyloxazole which comprises reacting an alkyl ester of an aliphatic carboxylic acid with a 2-methyloxazole selected from the group consisting of 2-methylbenzoxazoles and 2-methylnapthoxazoles in the N,N-dimethylamide of a lower fatty acid in the presence of a catalytic amount of an alkali metal hydride catalyst.

2. The process of claim 1, wherein said amide comprises dimethyl formamide.

3. The process of claim 1, wherein said amide comprises dimethyl acetamide.

4. The process of claim 1, wherein said alkyl ester comprises an ester of acetic acid.

5. The process of claim 1, wherein said alkyl ester comprises an ester of propionic acid.

6. The process of claim 1, wherein said 2-methyloxazole comprises 2-methylbenzoxazole.

7. The process of claim 1, wherein said 2-methyloxazole comprises 2,5,6-trimethylbenzoxazole.

8. The process of claim 1, wherein said 2-methyloxazole comprises 2-methyl-5-phenylbenzoxazole.

9. The process of claim 1, wherein said reaction is carried out at from 20–150° C.

No references cited.

ALEX MAZEL, *Primary Examiner.*

RICHARD J. GALLAGHER, *Assistant Examiner.*